Patented Mar. 31, 1953

2,633,476

UNITED STATES PATENT OFFICE 2,633,476

PRODUCTION OF AROMATIC HYDROPEROXIDES

Frank H. Seubold, Jr., Berkeley, Calif., assignor to Shell Development Company, Emeryville, Calif., a corporation of Delaware No Drawing. Application March 4, 1952, Serial No. 274,829

10 Claims. (Cl. 260—610)

This invention relates to improvements in the production of aralkyl hydroperoxides. The invention relates more particularly to improvements in the production of aralkyl hydroperoxides by the oxidation of aromatic compounds containing an alkyl group which is directly attached to the aromatic nucleus by means of a tertiary carbon atom.

The aralkyl hydroperoxides are of importance in many fields of application. They are employed as catalysts and initiators in the execution of many organic reactions such as, for example, polymerization and oxidation of unsaturated compounds. More recently they have attained increased prominence as potential starting materials for the production of valuable derivatives therefrom such as, for example, phenols and ketones.

Aralkyl hydroperoxides are obtained by the direct oxidation with molecular oxygen of the corresponding aromatic compounds as exemplified by the following empirical formula:

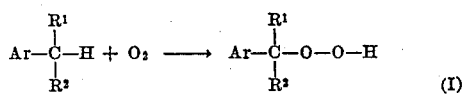
(I)

in which Ar represents an aromatic hydrocarbon radical selected from the group consisting of aryl and alkaryl groups, and $R^1$ and $R^2$ each represent the same or a different hydrocarbon radical such as, alkyl, cycloalkyl, aralkyl, alkaryl, as well as unsaturated hydrocarbon groups. The radical Ar may be mono- or poly-nuclear. The radicals Ar, $R^1$ and $R^2$ may be further substituted by minor substituents such as, methoxy, ethoxy, chloro, bromo and nitro radicals.

Aralkyl hydroperoxides comprise the hydroperoxides of alkyl benzene in which the hydroperoxide group (O—O—H) is linked to an aliphatic carbon atom which is directly attached by a single bond to a nuclear carbon atom in the benzene ring and obtained by direct oxidation with molecular oxygen of the corresponding alkyl benzenes represented by the following empirical formula:

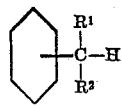
(II)

wherein $R^1$ and $R^2$ represent the same or different members of the group consisting of hydrocarbon radicals such as, alkyl, cycloalkyl, aryl, alkaryl and aralkyl. The radical $R^1$ may be joined to the radical $R^2$ to form a cyclic nucleus containing the carbon atom directly linked to the benzene nucleus. One or more replaceable hydrogen atoms attached to the benzene nucleus may be substituted by an aliphatic radical such as, for example, alkyl and cycloalkyl radicals. The above-defined alpha,alpha-substituted alkyl benzene hydroperoxide may be referred to as members of the class consisting of alpha,alpha-di-hydrocarbylbenzyl hydroperoxides, comprising the di-alkyl- and di-cycloalkylbenzyl hydroperoxides. Specific examples of the above-defined alpha,alpha-di-hydrocarbylbenzyl hydroperoxides comprise for example, isopropylbenzene, 2-phenyl-butane, 1-methyl-4-isopropylbenzene, p-di-isopropylbenzene, p-tert.-butyl-isopropylbenzene, p-methoxy-isopropylbenzene, isopropylnaphthalene, their homologues, etc.

In applying the process of the invention to the oxidation of the aralkyl hydrocarbons, the oxidation step itself is effected in accordance with any of the methods heretofore disclosed in the prior art. Thus, the molecular oxygen or an oxygen-containing gas such as, for example, air, may be passed through the aralkyl hydrocarbon while the latter is in the liquid phase. Temperatures employed comprise those ranging, for example, from about 5° C. to about 100° C., preferred temperatures depending upon the specific hydrocarbon to be oxidized. Pressures comprising atmospheric and slightly superatmospheric pressures up to about 100 pounds are generally satisfactory. It is to be understood, however, that application of the invention to the direct oxidation of aralkyl hydrocarbons to aralkyl hydroperoxides is in no wise limited by specific conditions employed in the oxidation stage of the process. Examples of the aralkyl hydroperoxides obtained from the corresponding aralkyl hydrocarbons in accordance with the above empirical Equation I comprise, for example, alpha,alpha-dimethylbenzyl hydroperoxide, alpha-ethyl-alpha-methylbenzyl hydroperoxide, alpha,alpha-dimethyl-p-methylbenzyl hydroperoxide, alpha,alpha-dimethyl-p-isopropylbenzyl hydroperoxide, and alpha,alpha-dimethylnaphthylmethyl hydroperoxide.

Production of the aralkyl hydroperoxides by the direct oxidation of the corresponding aralkyl hydrocarbons, as defined above, is often severely handicapped by difficulties detracting materially from efficient operation of the process. These difficulties comprise, for example, inordinately long induction periods and relatively low yields of the desired hydroperoxide. These difficulties often manifest themselves to a degree rendering highly impractical if not impossible the practical operation of the oxidation reaction on a large scale.

It has now been found that at least a substantial part of the difficulties heretofore encountered in the oxidation of aralkyl hydrocarbons to the corresponding hydroperoxides are obviated to at least a substantial degree by subjecting the aralkyl hydrocarbon to a two stage treatment prior to the oxidation wherein the aralkyl hydrocarbon is contacted with a strong mineral acid in one stage of the treatment and with an alkali metal in the other. In a preferred embodiment of the invention the aralkyl hydroperoxide is first contacted with a mineral acid such as, for example, sulfuric acid, and thereafter with an alkali metal such as, for example, metallic sodium prior to oxidation. The acid-treated aralkyl hydroperoxide is preferably washed with water and dried prior to the alkali metal treatment.

It has been found that difficulties heretofore encountered in oxidizing aralkyl hydrocarbons to aralkyl hydroperoxides are not obviated by pretreatment of the charge by methods disclosed heretofore. It has also been found that applying to the aralkyl hydroperoxide but one of the two separate steps constituting the combination treatment of the invention in no wise enables the attainment of the objects of the invention with respect to improved efficiency in the oxidation.

The following example exemplifies the difficulty inherent in the oxidation of an untreated charge as well as the ineffectiveness of a pretreatment consisting essentially of contact with an alkali metal.

Example I 500 cc. of isopropylbenzene were introduced into a distillation flask. Approximately 5 grams of metallic sodium chips were introduced into the still. The isopropylbenzene was refluxed over the sodium and then distilled.

338 grams of the isopropylbenzene which had been distilled from sodium was subjected to oxidation by placing the isopropylbenzene in a glass reactor and passing molecular oxygen therethrough at a temperature of 115–120° C. at a rate of about 100 cc. of oxygen per minute during a period of approximately six hours. The average hourly oxygen take-up by the isopropylbenzene amounted to only 4.4% per hour. Pronounced slackening of the rate at which oxygen reacted, as evidenced by the low rate of oxygen take-up by the isopropylbenzene, was paralleled by the appearance of water in the reaction products and pronounced discoloration. Conversion of isopropylbenzene to alpha,alpha-dimethylbenzyl hydroperoxide amounted to 22%.

In a separate and independent operation isopropylbenzene which had not been so pretreated was oxidized under substantially identical conditions. The average hourly oxygen take-up by the isopropylbenzene amounted to not more than about 0.5% per hour of the oxygen charged. Conversion of isopropylbenzene to alpha,alpha-dimethylbenzyl hydroperoxide obtained was about 3%.

It is seen that from the foregoing that a treatment consisting essentially of the contacting of the isopropylbenzene with metallic sodium in no wise enables the attainment of oxidation reaction rates, as indicated by rate of oxygen take-up, commensurate with efficient practical scale operation.

Subjection of the isopropylbenzene to a pretreatment with a mineral acid such as, for example, sulfuric acid, is also found to fail to increase to any substantial degree the efficiency of the process as evidenced by the following example.

Example II

Isopropylbenzene which had been treated by contact with concentrated sulfuric acid, washed with aqueous sodium hydroxide and water and thereafter distilled, was oxidized under substantially the same oxidation conditions employed in the operations of Example I. The average hourly oxygen take-up by the isopropylbenzene amounted to 1.3%. Conversion of isopropylbenzene to alpha,alpha-dimethylbenzyl hydroperoxide did not exceed about 8%.

It is apparent that a pretreatment consisting essentially only of contact with sulfuric acid in no wise obviates the difficulties heretofore encountered in the oxidation of aralkyl hydrocarbons to the corresponding hydroperoxides. When, however, the aralkyl hydroperoxide is subjected consecutively to both mineral acid treatment and contact with alkali metal prior to subjection to oxidation conditions, surprisingly improved results are obtained in terms of rates of conversion and yields of the desired hydroperoxides, thereby bringing the process within the realm of practicability.

In accordance with the invention the aralkyl hydrocarbon to be oxidized, for example, an alpha,alpha-dialkylphenylmethane, such as, isopropylbenzene is brought into contact with a mineral acid in a suitable treating zone. Acids which may be employed in accordance with the process of the invention comprise broadly the mineral acids and preferably the strong mineral acids. Acids which may be employed comprise, for example, sulfuric acid, phosphoric acid, etc. The use of sulfuric acid is preferred. It is preferably employed in the form of acid of about 70% to about 95% strength. Sulfuric acid of greater or lesser dilution may, however, be employed within the scope of the invention.

Contact of the aralkyl hydroperoxide with mineral acid may be effected in any suitable treating zone, comprising, for example, the treating vessels of the prior art enabling efficient contact of sulfuric acid with aralkyl hydroperoxide in the liquid phase. Separation of the acid from the aralkyl hydroperoxide is effected in any suitable manner comprising, for example, such steps as phase separation, settling, decantation, distillation and the like.

The acid treated aralkyl hydroperoxide is preferably washed with water, and optionally with an aqueous solution of an alkali metal hydroxide, such as, for example, aqueous sodium hydroxide and dried prior to treatment with the alkali metal. Contact of the aralkyl hydroperoxide with the alkali metal in accordance with the invention is preferably effected at a temperature above room temperature, but not exceeding to any substantial degree the temperature at which the greater part of the aralkyl hydrocarbon is in the vapor phase. In the preferred method of contacting the aralkyl hydroperoxide with the alkali metal, the alkali metal is maintained in a still into which aralkyl hydroperoxide is passed and from which aralkyl hydroperoxide is thereupon distilled leaving alkali metal, together with higher boiling impurities, as still bottoms. The aralkyl hydroperoxide may be subjected to reflux distillation over the alkali metal prior to its distillation therefrom. Suitable alkali metals comprise, for example, sodium, potassium, lithium, rubidium and cesium. The use of metallic sodium is, however, preferred. The minimum amount of metallic alkali metal required to effect the desired treatment of the aralkyl hydroperoxide may vary considerably within the scope of the invention. In general, it is preferred to employ the alkali metal in excess of such a minimum. The presence of the alkali metal in the aralkyl hydrocarbon in an amount of, for example, from about 0.5 to about 5% will be found satisfactory. Greater or lesser amounts of the alkali metal may, however, be used within the scope of the invention.

It is understood that the invention is in no wise limited by the specific method employed in bringing the mineral acid and the alkali metal into contact with the aralkyl hydroperoxides. In a preferred method of carrying out the pretreatment of the oxidation charge the aralkyl hydrocarbon is first brought into contact with the mineral acid and is thereafter contacted with the metallic alkali metal.

The substantial improvement in efficiency with which the aralkyl hydrocarbon oxidation is carried out after the two stage pretreatment in accordance with the invention is exemplified by the following example:

*Example III*

To 1,000 cc. of isopropylbenzene there was added 50 cc. of cold concentrated sulfuric acid. After agitation of the mixture the acid phase was separated by stratification. The acid layer thus separated was discolored. The sulfuric acid treatment was repeated nine times, each time using 50 cc. of concentrated sulfuric acid. The color of the acid layer separated after each treatment became lighter with each treatment. The thus acid-treated isopropylbenzene was washed twice with water and thereafter twice with 100 cc. portions of 10% sodium hydroxide solution. The isopropylbenzene was then again washed with water and dried over sodium sulfate. The resulting acid-treated isopropylbenzene was filtered into a kettle containing about 5 grams of sodium chips. The isopropylbenzene was refluxed for a period of one hour over the sodium and thereafter distilled through a Vigreux column with a top column temperature of 150.5–151° C.

400 cc. of the purified ispropyl benzene was oxidized under substantially the same conditions of oxidation employed in the isopropylbenzene oxidation of the foregoing examples. The average hourly oxygen up-take amounted to 10.3% of the oxygen charged. A conversion of isopropylbenzene to alpha,alpha-dimethylbenzyl hydroperoxide of 32.5% with a yield of 97% was obtained.

In effecting the two-stage pretreatment of the isopropylbenzene in combination with an isopropylbenzene oxidation operation the isopropylbenzene charge is preferably passed through an acid treating zone wherein it is contacted with the mineral acid. The acid-treated isopropylbenzene is separated from the mineral acid, washed with aqueous sodium hydroxide and water, and passed into a distillation zone. Overhead from the distillation zone is dried and passed through a suitable alkali metal treating zone wherein the acid treated isopropylbenzene is contacted with the alkali metal. Alkali metal-treated isopropylbenzene emanating from the alkali treating zone is preferably subjected to a distillation, and the overhead therefrom passed directly into the isopropylbenzene oxidizing zone. Unconverted isopropylbenzene separated from the oxidation products is recycled in part, or in its entirety, to the mineral acid charge pretreating zone of the process.

The invention claimed is:

1. In a process for the production of an aralkyl hydroperoxide-containing reaction mixture by the reaction of an aralkyl hydrocarbon with oxygen the improvement which comprises passing said aralkyl hydrocarbon through two consecutive pretreating zones, and contacting said aralkyl hydrocarbon with a strong mineral acid in one of said zones and with an alkali metal in another of said zones.

2. The process in accordance with claim 1 wherein said mineral acid is sulfuric acid and said alkali metal is metallic sodium.

3. In a process for the production of an alpha,-alpha-dialkyl aralkyl hydroperoxide-containing reaction mixture by the reaction of an alpha,-alpha-dialkyl aralkyl hydrocarbon with an oxygen-containing gas, the improvement which comprises passing said alpha,alpha-dialkyl aralkyl hydrocarbon through two consecutive pretreating zones prior to said oxidation, and contacting said alpha,alpha-dialkyl aralkyl hydrocarbon with a strong mineral acid in one of said pretreating zones and with an alkali metal in the other of said pretreating zones.

4. The process in accordance with claim 3 wherein said mineral acid is sulfuric acid and said alkali metal is metallic sodium.

5. In a process for the production of an alpha,-alpha-dialkyl phenylalkyl hydroperoxide-containing reaction mixture by the interaction of an alpha,alpha-dialkyl-substituted alkylbenzene with an oxygen-containing gas, the improvement which comprises passing said alpha,alpha-dialkyl-substituted alkylbenzene through two consecutive pretreating zones prior to said oxidation, and contacting said alpha,alpha-dialkyl-substituted alkylbenzene with sulfuric acid in one of said pretreating zones and with metallic sodium in the other of said pretreating zones.

6. In a process for the production of an alpha,-alpha-dialkylbenzyl hydroperoxide-containing reaction mixture by the reaction of an alpha,alpha-dialkyl methylbenzene with an oxygen-containing gas, the improvement which comprises passing said alpha,alpha-dialkyl methylbenzene through two consecutive pretreating zones prior to said oxidation, and contacting said alpha,alpha-dialkyl methylbenzene with a strong mineral acid in one of said pretreating zones and with an alkali metal in the other of said pretreating zones.

7. The process in accordance with claim 6 wherein said mineral acid is sulfuric acid and said alkali metal is metallic sodium.

8. In a process for the production of alpha,-alpha-dimethylbenzyl hydroperoxide-containing reaction mixtures by the reaction of isopropylbenzene with an oxygen-containing gas, the improvement which comprises passing said isopropylbenzene through two consecutive pretreating zones prior to said oxidation, and contacting said isopropylbenzene with a strong mineral acid in one of said pretreating zones and with metallic sodium in the other of said pretreating zones.

9. The process in accordance with claim 8 wherein said mineral acid is sulfuric acid and said alkali metal is metallic sodium.

10. In a process for the production of alpha,- alpha-dimethylbenzyl hydroperoxide-containing reaction mixtures by the reaction of isopropylbenzene with an oxygen-containing gas, the improvement which comprises contacting said isopropylbenzene with sulfuric acid and thereafter distilling said isopropylbenzene from metallic sodium prior to said oxidation.

FRANK H. SEUBOLD, Jr.

REFERENCES CITED

The following references are of record in the file of this patent:

UNITED STATES PATENTS

| Number | Name | Date |
|---|---|---|
| 2,547,938 | Hall et al. | Apr. 10, 1951 |

FOREIGN PATENTS

| Number | Country | Date |
|---|---|---|
| 610,293 | Great Britain | Oct. 13, 1948 |